United States Patent [19]
Britton et al.

[11] Patent Number: 5,371,886
[45] Date of Patent: Dec. 6, 1994

[54] SYSTEM FOR MANAGING UNIT-OF-WORK IDENTIFIERS WHEN A CHAINED, DISTRIBUTED, TWO PHASE COMMIT TRANSACTION SYSTEM IS SEVERED

[75] Inventors: Kathryn H. Britton, Chapel Hill; Andrew P. Citron, Raleigh, both of N.C.; Bruce G. Lindsay, San Jóse, Calif.

[73] Assignee: International Business Machines Corporation, Armonk, N.Y.

[21] Appl. No.: 164,656

[22] Filed: Dec. 9, 1993

Related U.S. Application Data

[63] Continuation of Ser. No. 583,542, Sep. 17, 1990, abandoned.

[51] Int. Cl.$^5$ .............................................. G06F 15/40
[52] U.S. Cl. .................................... 395/600; 395/575; 395/650; 364/DIG. 1; 364/282.1; 364/282.4; 364/284; 364/285; 364/285.2; 364/285.3; 364/286
[58] Field of Search ......................... 395/575, 600, 650

[56] References Cited
U.S. PATENT DOCUMENTS
4,665,520  5/1987  Strom et al. ............................. 371/7

OTHER PUBLICATIONS

Lin et al, Distributed Recovery in Application Systems, Proceedings of the 1986 International Conference on Parallel Processing, Aug. 19, 1986, pp. 405-412.

Primary Examiner—Thomas G. Black
Assistant Examiner—Wayne Amsbury
Attorney, Agent, or Firm—Jerry W. Herndon

[57] ABSTRACT

A method of managing unit-of-work identifiers in a chained distributed database transaction system. The system has a plurality of processing nodes which are logically connected to form a tree. Normally, each node automatically increments its present identifier at the end of processing each transaction to derive the next transaction identifier. However, in response to a failure condition which results in a severed tree, the distributed database that now reside in the first and second subtrees that result from the severance are forced to consistent states. The transaction identifier is incremented in each of the nodes of the first subtree. Transaction work in the first subtree then proceeds with the incremented identifier. The second subtree is dismantled. In response to a nonfailure condition which results in a severed tree, the distributed database in the first and second subtrees that result from the nonfailure severance is committed to a permanent state. The transaction identifier in each of the nodes of the first subtree is incremented. Transaction work in the first subtree then proceeds with the incremented identifier. A new transaction identifier is generated and propagated to all nodes of the second subtree. Transaction work in the second subtree then proceeds with the new identifier.

11 Claims, 9 Drawing Sheets

SYSTEM FOR MANAGING UNIT-OF-WORK IDENTIFIERS WHEN A CHAINED, DISTRIBUTED, TWO PHASE COMMIT TRANSACTION SYSTEM IS SEVERED

This application is a continuation of application Ser. No. 07/583,542, filed Sep. 17, 1990, now abandoned.

TECHNICAL FIELD

The invention is related to database and transaction processing systems generally and, in particular, to distributed systems which use two-phase commit and backout protocols to insure that database consistency is maintained.

BACKGROUND OF THE INVENTION

Sync Point managers (SPMs) provide an operating system service that makes it possible for distributed transaction programs (TPs) to perform atomic transactions, i.e., logical units of work (LUWs) consisting of data updates that are either all committed (made permanent) or all backed out (undone). An atomic transaction is identified by a logical unit of work identifier, called an LUWID in this description. All accesses to data involved in a transaction are associated with its LUWID. Thus a database manager, when asked by an SPM to commit a transaction, uses the LUWID to identify the data updates that are to be made permanent. Some data base managers will allow two programs participating in the same transaction, i.e., using the same LUWID, simultaneous access to data resources, reducing the probability that deadlocks between programs will occur.

As a result of these uses of the LUWID, it is vital that all programs participating in the same transaction use the same LUWID, and that two programs not participating in the same transaction, and will thus not commit together, have different LUWIDs. This includes programs that were once working together on the same transaction, but are no longer connected because the communications connection is taken down normally or because of failures.

In unchained transaction systems, each transaction (LUW) is explicitly started and terminated by a TP and a new LUWID for each transaction is sent by its associated SPM to the SPMs of other TPs involved in the transaction. Unchained transactions are used when not all work of the programs need to be treated as part of an atomic transaction. Thus the work that occurs between the end of one transaction and the explicit start of the next cannot be backed out or committed in a coordinated fashion. Also, with unchained transactions, there tends to be a fixed hierarchical relationship between programs, since the protocols for distributing the LUWID require that the LUWID always flow down the tree of TPs, that is, the tree where each branch is created when a program creates a connection to another program.

Chained transaction systems are those in which the end of a transaction at any TP inherently marks the beginning of the next transaction at that TP. Thus, there is no need for any TP to explicitly start the next. With chained transactions, all work performed by any program in a tree is part of an atomic transaction. Since this is the case, the LUWID for a new transaction is generated implicitly by incrementing the LUWID for the last transaction without any explicit actions by TPs or any messages sent between SPMs. Since this is the case, there is no required fixed hierarchical relationship between programs involved in the transaction.

In distributed transaction systems, partner TPs can exist in different nodes of the system connected by communications links or within one node of the system. These TPs form a tree of programs whose data updates will either commit or backout together. A problem arises in chained systems when a transaction tree is broken apart. Subtrees can become separated because of failures in the underlying communications connections, or because an error is detected that causes one TP or operating system (OS) to abnormally terminate the connection. Subtrees can also become separated because a TP chooses to terminate its connection normally to another TP. In chained transactions, special action is required to prevent TPs in severed subtrees that can no longer commit together from proceeding with the same LUWID, since both sides normally generate their next LUWID by incrementing the LUWID that they shared for the previous transaction. If these severed TPs were not prevented from proceeding with the same LUWID, data damage could occur; that is, data could be backed out that should be committed, and vice versa.

The conventional method of solving this problem is by dismantling all nodes of both severed subtrees after the tree break occurs. A new tree can then be rebuilt. While this works to prevent data damage, it is very expensive in terms of the amount of work that must be performed and the resulting system time lost in recreating the connections. Therefore a need exists to ensure that subtrees separated for any reason will proceed with different unit-of-work identifiers without completely dismantling the tree.

SUMMARY OF THE INVENTION

The above problems are solved in a method of managing unit-of-work identifiers in a chained distributed transaction system. The system has a plurality of processing nodes which are logically connected to form a tree. Normally, each node automatically increments its present identifier at the end of processing each transaction to derive the next transaction identifier. However, in response to a failure condition which results in a severed tree, the distributed database that now reside in the first and second subtrees that result from the severance are forced to consistent states. The transaction identifier is incremented in each of the nodes of the first subtree. Transaction work in the first subtree then proceeds with the incremented identifier. The second subtree is dismantled.

In response to a nonfailure condition which results in a severed tree, the distributed database in the first and second subtrees that result from the nonfailure severance is committed to a permanent state. The transaction identifier in each of the nodes of the first subtree is incremented. Transaction work in the first subtree then proceeds with the incremented identifier. A new transaction identifier is generated and propagated to all nodes of the second subtree. Transaction work in the second subtree then proceeds with the new identifier.

In a preferred embodiment, when a tree is abnormally severed, such as by a connection failure or by a transaction program in response to an error, the present transaction is backed out in the subtree that includes the root node of the original tree (hereafter called the allocator subtree). This subtree is left intact. All nodes in the subtree increment their LUWIDs and continue as normal. The transaction is also backed out in the subtree on the other side of the severance, hereafter called the nonallocator subtree. However, in the process of backing out, all connections between nodes are dropped, thereby dismantling the nonallocator subtree. Each transaction program in the dismantled subtree generates a new and unique LUWID for use with any subsequent work that it performs. The backout on both sides is required because programs in disconnected subtrees can begin work on a new transaction before they each generate different LUWIDs. Therefore it is possible for programs in disconnected subtrees to start work with the same LUWID. To avoid damage caused by this, both subtrees backout any work performed after the tree breakage that used the old LUWID that is no longer valid.

When a tree is severed by a program as a result of a nonfailure condition, a new LUWID is generated in one of the subtrees and propagated to all members of the subtree as part of the two-phase commit protocol flows. In the other subtree, the LUWID is incremented as usual. Thus both subtrees remain intact and proceed with different LUWIDs.

The invention automatically handles cases in which both failure and non-failure breakages occur in the same tree within the same transaction. This ensures that a node that is processing a nonfailure tree breakage follows the rules for a failure breakage if it receives a message during the two-phase commit flows that indicates that a failure breakage has occurred elsewhere in the tree. This ensures that multiple breakages will not result in disconnected subtrees proceeding with the same identifier.

The invention ensures that appropriate LUWIDs are used to support coordinated update commit protocols and deadlock avoidance in distributed chained transactions where a program can independently start work on a transaction, and any program can cause a commit operation to begin.

DETAILED DESCRIPTION

A logical unit of work (LUW) in a database system is a sequence of actions performed to take a set of resources, typically database records, from one consistent state to another in such a way that the LUW appears to be atomic. If a failure occurs during a LUW, the changes made as part of the LUW are undone, so that the resources return to the consistent state that existed at the start of the LUW.

Two-phase commit protocols are used to insure atomic consistency, even in the face of failures. The basic protocols are described in J. N. Gray's "Notes on Database Operating System," published in Operating Systems—An Advanced Course; Lecture Notes in Computer Science; Volume 60, Springer-Verlag, 1978. Some variations of these protocols for use in the System Network Architecture (SNA) are described in IBM's LU 6.2 Reference: Peer Protocols (SC31-6808-0). Other variations are described in "The R* Distributed Database Management System", 1986, ACM 03625915/86/1200-0378. Still other variations are discussed in the draft international standard for OSI for distributed transaction processing, ISO/IEC JTC 1/SC 21 N2608 Information Processing Systems—Open Systems Interconnect—Distributed Transaction Processing Part 1;

Transaction Processing Model. ISO/IEC JTC 1/SC 21 N2607—Information Processing Systems—Open Systems Interconnect—Distributed Transaction Processing Part 2;

Service Definition. ISO/IEC JTC 1/SC 21 N2608 Information Processing Systems—Open Systems Interconnect—Distributed Transaction Processing Part 3.

Figure 1:
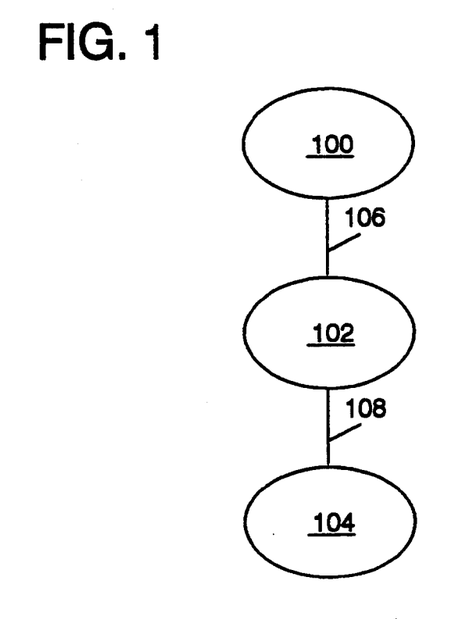
FIG. 1 shows a simple distributed network consisting of three nodes serially connected by communication links.

For completeness, the basic two-phase protocols will be briefly described with reference to FIG. 1. Reference is made to the above publications for a complete description. FIG. 1 shows a simple node tree consisting of nodes 100, 102 and 104. Nodes 100 and 102 are connected by a conversation 106. Nodes 102 and 104 are connected by a conversation 108. This tree is referred to as an allocation tree. The allocation tree refers to the fixed relationship among programs that is established when connections are created. That is, the creator of a connection is higher up the allocation tree than its partner program. In contrast, a transaction tree can change for each transaction depending on the node that initiates a commit operation. For example, if node 102 starts a commit, it becomes the root of the transaction tree, with descendant nodes 100 and 104. In the allocation tree, node 100 is always the root node with child nodes 102 and 104. How allocation trees are established is described in more detail below. Now, assuming that node 102 initiates a commit operation, this means that the TP issued a command to start a two-phase commit operation. At this point node 102 sends a PREPARE TO COMMIT message to both nodes 100 and 104, thereby becoming the commit coordinator. Each node 100 and 104 decide individually if operations have proceeded satisfactorily from their point of view and each return a vote. In the normal case, both nodes 100 and 104 return an AGREE message to node 102. After receiving the AGREE from nodes 100 and 104, node 102 sends a COMMIT message to nodes 100 and 104 and the data modifications performed at each of the nodes are made permanent. FORGET messages are then returned to node 102 in this example as acknowledgements to the COMMIT message. At this point, in a chained transaction system, each of the nodes increment their LUWIDs and proceed to new work. If either of nodes 100 or 104 return a BACKOUT response to the PREPARE TO COMMIT, node 102 sends a BACKOUT message to the node which did not return a BACKOUT and each node then returns its data to the consistent state that existed at the beginning of the present transaction. Each node then increments its LUWID in a chained system and proceeds with new work. This simple example has many variations depending on the specific two-phase commit protocol that is used by a system and on the specific transaction tree in use. Other protocol responses relevant to the invention will be discussed at the appropriate points below.

The following description contains a number of other operations relevant to sync point processing that needs some explanation. Resynchronization is a service performed automatically by SPMs after detection of a conversation failure during a commit operation. During resynchronization, two SPMs adjacent to the break exchange information so that they can take the same action, either to commit or backout, even though their subtrees are severed. The resynchronization will continue indefinitely until the exchange has been achieved or until manual intervention terminates it. An RIP (resynchronization in progress) indicator attached to a FORGET or BACKOUT message means that there is an incomplete resynchronization in the tree. A CEB indicator attached to a message means that the conversation over which the message flows is to be deallocated (terminated) immediately. This indicator flows with the last two-phase commit message (e.g., FORGET) if the TP requests that the conversation be deallocated. A heuristic mixed (HM) message indicates that data inconsistency has occurred because some sync point managers involved in a distributed LUW backout the LUW and other sync point managers commit the LUW. This occurs when an operator forces local resources to commit or backout without waiting for the commit operation to conclude normally. This can occur, for example, when a TP that is excessively delayed waiting for a resynchronization operation holds locks on system resources for which there is heavy demand. Heuristic damage is always a danger when an operator forces completion in this way.

Figure 2:
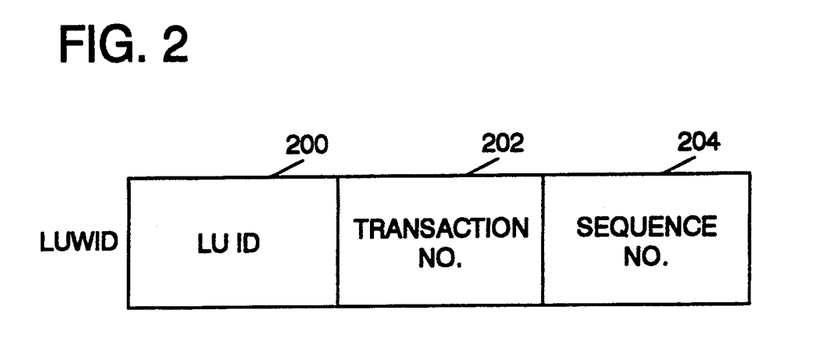
FIG. 2 shows one illustrative format of a logical-unit-of-work identifier (LUWID)

The invention is described in terms of IBM's SNA logical unit (LU) 6.2 architecture, although it will be apparent that the invention is not limited to this environment. As shown in FIG. 2, the LU 6.2 logical-unit-of-work identifier (LUWID) consists of three components: the identify of the LU that initially generates the LUWID (field 200), a transaction instance number (field 202), which is unique at the generating LU, and a sequence number (field 204) which starts at 1 and is incremented automatically by 1 at each LU participating in a transaction following each commit or backout. This is the chained operation mentioned above.

The inclusion of the identity of the generating LU in LUWIDs guarantees the uniqueness of the LUWIDs for individual transactions, since the LU identity field 200 of the LUWID differentiates all LUWIDs generated by one LU from all LUWIDs generated by other LUs. In the preferred embodiment of the invention, the transaction number is generated using a date-time stamp.

Figure 3:
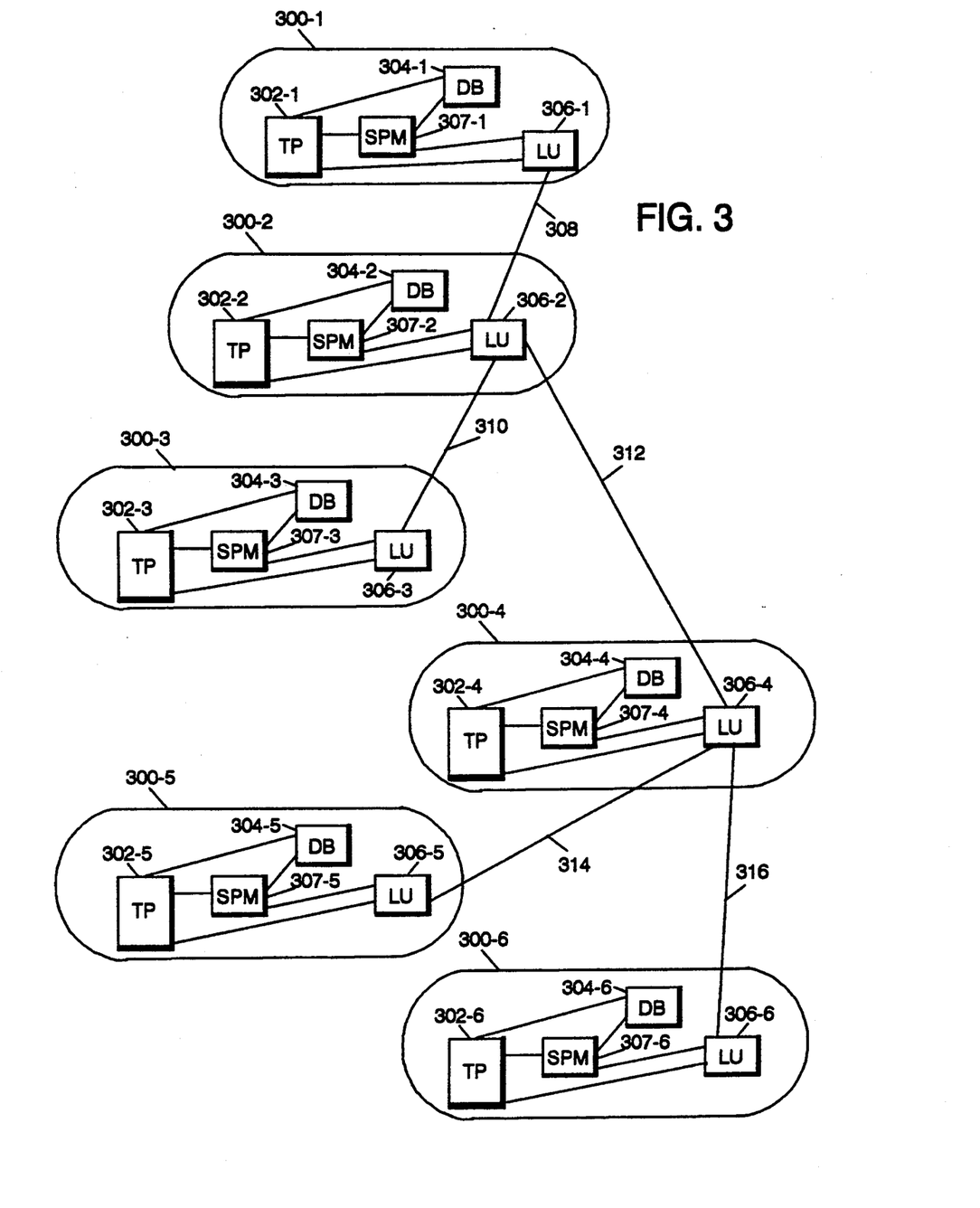
FIG. 3 shows a more complicated distributed network in which each node includes a SPM, a transaction program (TP), a database resource and a logical unit (LU) which is used to allow a TP to communicate with another TP in the same or a different node.

FIG. 3 shows one illustrative transaction tree consisting of nodes 300-1 through 300-6. The network of which this tree is a part might include many other nodes. Each node contains an SPM 307, at least one transaction program (TP) 302, a resource such as database 304 and a logical unit (LU) 306 by means of which a TP can communicate with other TPs. While FIG. 3 shows one TP at each node, it should be understood that in the general case, a node may contain multiple TPs all interacting with themselves and other nodes via LUs to effect resource transactions. Resources may be viewed as including virtually anything available at a node for use by a TP, such as local files and devices. However, for the purposes of this disclosure, such resources will be considered to be databases for simplicity.

An LU executes communication verbs issued by a local TP and a synchronization point manager (SYNCPT manager or SPM). Some of the verbs issued by a TP and executed by the LU serving it include those for allocating and deallocating (initiating and releasing) conversations with other TPs on sessions between LUs, both local and remote. Other verbs allow one TP to send or receive data to or from another TP. The SPM executes SYNCPT (commit) or BACKOUT verbs issued by a transaction program. The SPMs are responsible for committing or backing-out a transaction at all nodes on request of a TP. Reference is made to IBM publication TRANSACTION PROGRAMMER'S REFERENCE MANUAL FOR LU 6.2, GC30-3084 for a detailed description of the LU 6.2 verbs. Reference is made to IBM publication SC30-3269, FORMAT AND PROTOCOL REFERENCE MANUAL for a detailed description of the LU 306 and SPM 307. Both of these publications are incorporated by reference herein.

The creation of an allocation tree is now described. In the example of FIG. 3, it is assumed for illustration that a transaction program (TP) 302-1 at node 300-1 is initially activated. The activation of the first TP within an allocation tree to be established is product specific and irrelevant to the invention. For example, a given initial TP might be automatically started each time a given node is brought on-line, or an initial TP might be started on request of an operator. In any event, it is assumed for this example that this initial TP 302-1 allocates a conversation 308 with TP 302-2 at node 300-2. TP 302-2 further allocates conversations 310 and 312 with the TPs at nodes 300-3 and 300-4, respectively, and so on. In the LU 6.2 architecture, a conversation is allocated on a session between nodes in response to the issuance of the ALLOCATE verb by a TP to an LU connected to the session. In response to the ALLOCATE, a conversation ATTACH message is sent to the remote LU attached to the other end of the session. The ATTACH includes the name of the TP to which the conversation is to be attached. Thus, in FIG. 3, TP 302-1 initially issues an ALLOCATE verb to LU 306-1. LU 306-1 issues the ATTACH to LU 306-2. This ATTACH includes the name of TP 302-2. It also includes the logical-unit-of-work identifier (LUWID) assigned as explained above with respect to FIG. 2. This LUWID is the LUWID assigned at the root of the allocation tree, which is node 300-1 in this example. When TP 302-2 allocates a conversation to TP 302-3, the ATTACH message from LU 306-2 to LU 306-3 includes the same LUWID. When an allocation tree is completely established, as illustrated in FIG. 3, the resources at any or all of the tree nodes may be used to complete any given transaction.

In accordance with the invention, the following rules discussed in the context of LU 6.2 protocols manage unit-of-work identifiers when tree breakage occurs. Tree breakage can result from a communications failure. Alternatively, a TP may intentionally and normally break a tree when it wishes to remove nodes below it from the tree. This is accomplished by the issuance of a DEALLOCATE TYPE(SYNC_LEVEL) verb by a TP. The SYNC_LEVEL part of this verb defers deallocating the conversation until a SYNCPT verb is issued to cause a commit operation to occur. Breakage may also be caused intentionally when a TP or LU detects some type of processing error. This latter type of deallocation is called an abnormal deallocation and is initiated by a DEALLOCATE(ABEND) message from one node to another. The ABEND part of this message stands for "abnormal ending".

In accordance with the invention, when a tree is severed because of normal program-initiated conversation deallocation, a new LUWID is created and propagated in one of the subtrees. Both subtrees remain intact. In the preferred embodiment, the subtree on the side of the conversation to be deallocated that eventually receives a COMMIT message generates a new LUWID for its subtree and propagates it to the remaining nodes or TPs of its subtree, since it retains communication with the remaining nodes. The other subtree merely increments its present LUWID and proceeds with new work. To always achieve this result, the rule is imposed that normal conversation deallocation cannot occur without first performing a commit operation. DEALLOCATE TYPE(SYNC_LEVEL) followed by a SYNCPT verb is the only normal deallocation type allowed; if a SYNCPT verb results in the LUW being backed out, the conversation is not deallocated. If an LU sends HM or FORGET in reply to PREPARE TO COMMIT, it cannot receive an updated LUWID if there is a DEALLOCATE TYPE(SYNC_LEVEL) break above it in the transaction tree as part of phase 2 of a commit operation. Therefore its commit initiator will have to send it a NEW_LUWID message at the beginning of the next LUW if there is a change. A NEW_LUWID message is a message that flows along with the other two-phase commit messages. This message informs a receiving partner that the new LUWID included in the message should be used for the next transaction, since the old LUWID is obsolete. The NEW_LUWID message is sent following a COMMIT message, preferably in the same message flow. It is sent when a TP receives a COMMIT message from a partner that is being deallocated as part of the commit flows. The LUWID has the LU name of the sync point manager that generated it in the LU identity field 200 of the LUWID.

When a tree breakage occurs because of an error or communications failure between two nodes or TPs, the databases in both of the resulting subtrees must be forced to a consistent state and the subtrees must be prevented from using the same LUWID in subsequent units of work, since they can no longer coordinate commit or backout operations with each other. How the consistent state is reached depends on the point at which the error or failure is detected at each node. If the failure or ABEND occurs between commit operations, both subtrees backout the present LUW since they can no longer commit together. If the failure or ABEND occurs during a commit operation, the commit operation must complete, perhaps with resynchronization, and then the next LUW is back-out to make sure that no work has occurred in the separate subtrees with the incremented LUWID.

Following breakage of a tree, the LUWID that is used by each subtree must be made different. To achieve this, the rules are different in the two severed subtrees. In the preferred embodiment, in the subtree containing the root of the allocation tree, i.e., the allocator subtree, the sync point manager of the node detecting the failure backs out all resource modifications in the adjacent nodes of that subtree, which propagate the BACKOUT to their adjacent nodes, and so on. The LUWID is automatically incremented at all nodes in this subtree and work can continue with the incremented LUWID. Since TPs in either subtree may have already started work with the old LUWID, work associated with that LUWID must be backed out in both subtrees. The sync point manager of the first node in the nonallocator subtree, i.e., the node nearest the break, deallocates all conversations that it allocated. Recall that this is achieved with the DEALLOCATE TYPE(ABEND) verb, which disconnects the conversation and causes both sides of the disconnected conversation to backout the LUW. In the illustrative example of FIG. 3, assume that communications fails between nodes 300-2 and 300-4. In the allocator subtree, SPM 307-2 sends a BACKOUT message to both nodes 300-1 and 300-3. In the nonallocator subtree, LU 306-4 sends a DEALLOCATE TYPE(ABEND) message to both nodes 300-5 and 300-6.

After it propagates the abnormal deallocation, the sync point manager in the nonallocator subtree provides a new LUWID for any work started by its TP, with its own LU name in the LU identity field 200 of the LUWID. This permits the TP safely to begin new work. In accordance with the invention, each LU farther down the nonallocator subtree performs the same logical operations in response to DEALLOCATE TYPE(ABEND), so that the entire nonallocator subtree is dismantled, and each TP in the nonallocator subtree is given its own unique LUWID using its own LU identity for further access to resources.

Figures 4, 4C:
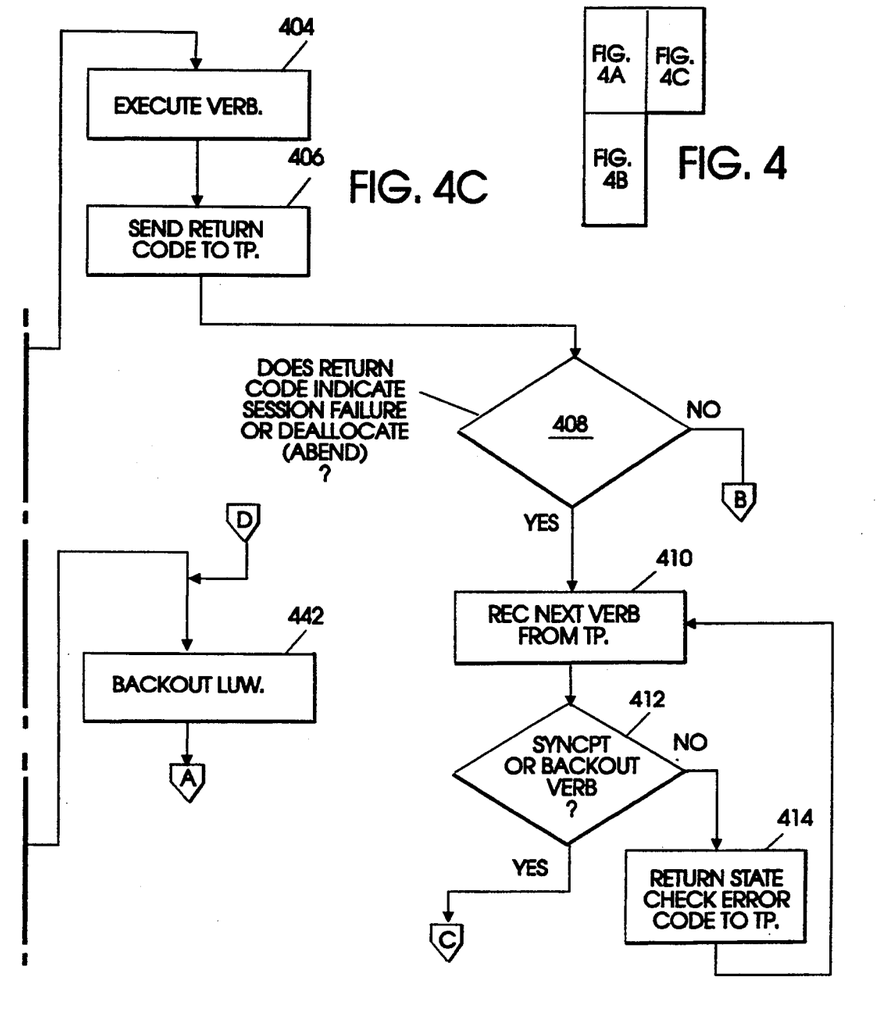
FIG. 4 shows illustrative steps for managing the LUWIDs in the different TPs for a chained transaction processing system like that of FIG. 3 in the face of severed subtrees of TPs caused both by abnormal and normal events.
Figure 4A:
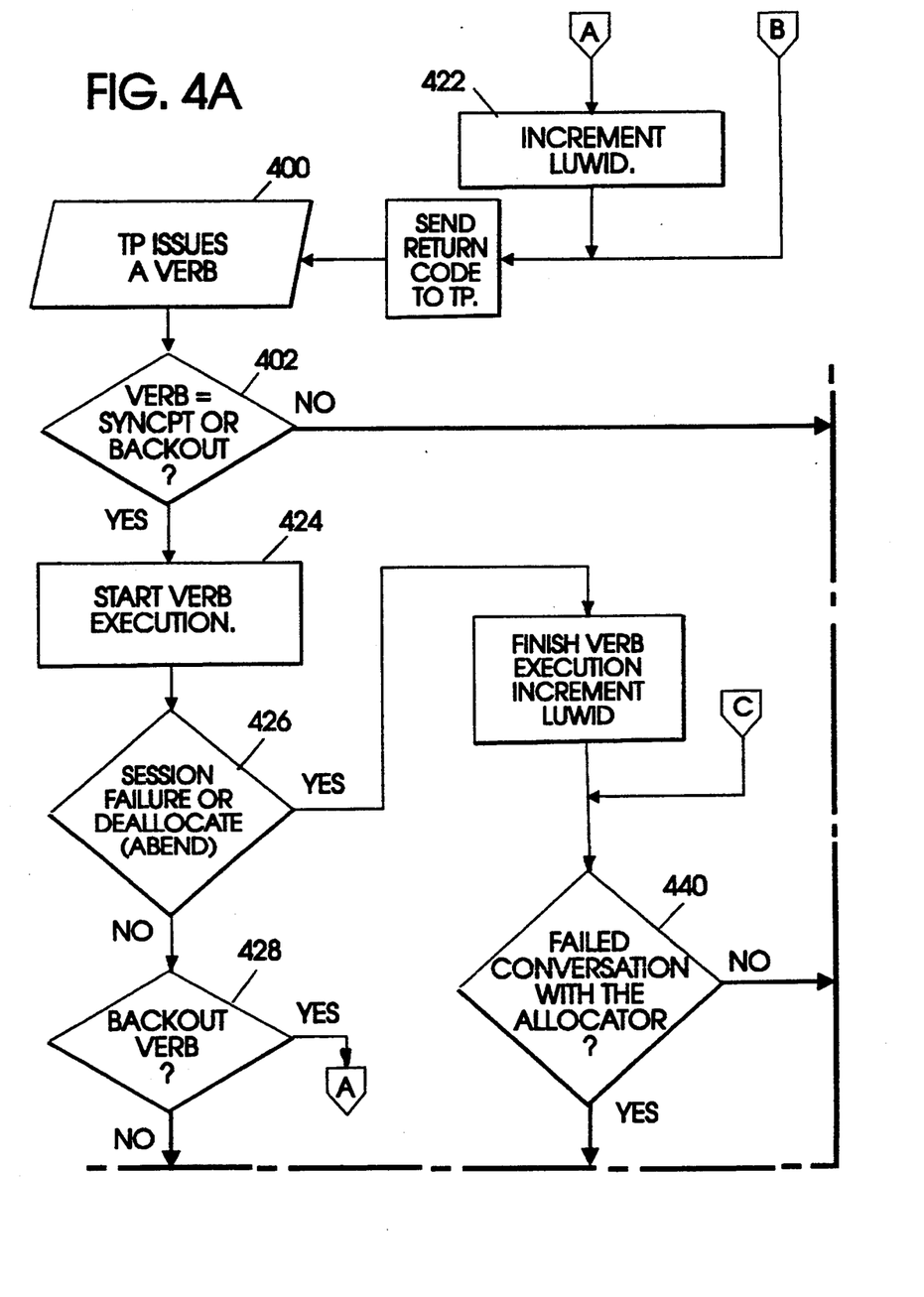

The steps shown in flowchart 4 illustrate the above concepts for managing LUWIDs. These steps are executed by the operating system, including the SPMs and LUs at each node of a transaction tree. Step 400 (FIG. 4a) receives a verb issued by a TP. Step 402 determines if the verb is a SYNCPT (commit) or a BACKOUT verb. If not, the LU executes the verb in the normal way at step 404 (FIG. 4c). Part of this normal processing is to determine the result of executing the verb. A return code that represents this result is returned to the TP at step 406. Step 408 next determines if the return code indicates that a communications failure has been detected with a partner TP or if a DEALLOCATE(ABEND) message has been received from a partner TP. If this is not the case, the LU returns (via program exit and entry B in FIG. 4) to a state at step 400 (FIG. 4a) awaiting the next verb issuance by the TP in question. Note that the present LUWID is not incremented. This only occurs after a SYNCPT or BACKOUT operation. If, at step 408 (FIG. 4c), the return code indicates a communications failure or a DEALLOCATE(ABEND) message is received, step 410 enters a state awaiting the next verb from the TP in question. At this point a backout operation is required, which the TP can initiate with either a SYNCPT or BACKOUT verb. The SYNCPT verb in this case is processed as a BACKOUT verb. Accordingly, when the next verb is received, step 412 determines if the verb is a SYNCPT or BACKOUT verb. If not, this means that the TP has issued a verb that cannot be processed. In this case, step 414 returns a "check state" return code to the TP to inform it of an inconsistency and then returns to step 410 to await a SYNCPT or BACKOUT verb. When the SYNCPT or BACKOUT verb is received, step 440 (FIG. 4a) determines if this LU resides in the nonallocator subtree. In this case, step 418 (FIG. 4b) initiates the dismantling of the subtree. This is done by the LU sending a DEALLOCATE TYPE(A-BEND) message to its partner LUs via conversations that it originally allocated. Thus, in FIG. 3, if TP 302-2 sends a DEALLOCATE TYPE(ABEND) to LU 306-4 or if a communications failure occurs on conversation 312, LU 306-4 at node 300-4 eventually initiates at step 418 the dismantling of the subtree of which it is a member by sending a DEALLOCATE TYPE(ABEND) to nodes 300-5 and 300-6. Node 300-4 generates a new LUWID for TP 300-4 at step 420 and proceeds with its work at step 400 (FIG. 4a). When LUs 300-5 and 300-6 at their respective nodes receive the DEALLOCATE TYPE(ABEND) verbs from LU 300-4, step 408 in FIG. 4c, or other steps yet to be described, of the LU program instance executing in that node, will act on the verb to further dismantle parts of the subtree, if any, that were allocated by the respective node. Thus, in FIG. 3, if there were an additional conversation allocated by node 300-5 as part of the transaction tree, the corresponding TP would receive a DEALLOCATE TYPE(ABEND) message from node 300-5. As each node in the subtree that is being dismantled breaks away from the subtree, it generates a new LUWID for itself and proceeds to new work using the new LUWID. This is shown at step 420. In accordance with the earlier mentioned rules for generating LUWIDs, the LUWID generated by each dismantled mode includes its own LU identity in field 200.

Returning to step 402 (FIG. 4a), if the verb issued by a TP at a node is SYNCPT or BACKOUT, step 424 initiates the execution of the verb by sending it to the SPM. Step 426 next determines during execution of the above SYNCPT or BACKOUT if a communications failure is detected or a DEALLOCATE TYPE(A-BEND) message has been received with or from a partner TP. Normally, the answer is no and step 428 determines if the verb under execution is BACKOUT. If the verb is BACKOUT, the verb execution is completed and return is made to step 400 via program exit and entry A in FIG. 4. Note that step 422 at entry A increments the present LUWID before proceeding at step 400 with the next verb issuance by the TP. This is done because the present transaction has been completed (backed out in this case) and a new transaction is now beginning. The LU program of FIG. 4 executing in every other node of the allocation tree will perform equivalent steps to increment its LUWID to the same state before proceeding with its new transaction.

Figure 4B:
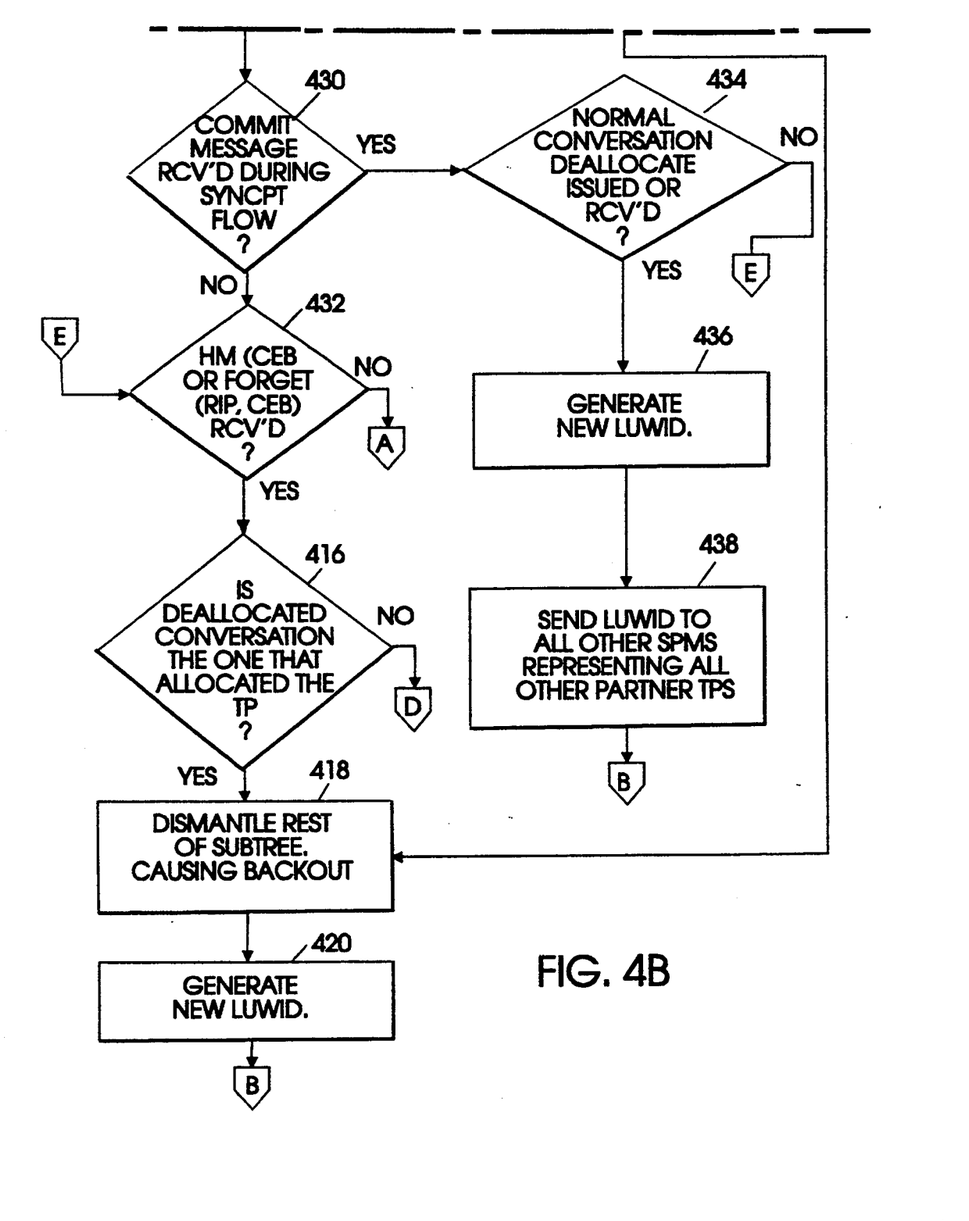

If at step 428, the present verb is not BACKOUT, then it must be SYNCPT. If, during the commit operation, the SPM receives a COMMIT message (step 430 in FIG. 4), step 434 next determines if this conversation is to be deallocated normally at the end of the commit operation. If not, the program proceeds to step 432. If so, steps 436 and 438 must generate a new LUWID, because the allocation tree is being split, and propagate it to all other partner SPMs in this subtree. This includes partners that replied FORGET to PREPARE TO COMMIT, indicating an abstention vote since they have made no changes that need to be committed. Thus, all SPMs in this subtree will proceed with the same LUWID. The SPM now waits for the next verb to arrive from its TP at step 400 (FIG. 4a). Note that the new LUWID is not incremented before proceeding to step 400, since it already has a unique LUWID for the next transaction from step 436 (FIG. 4b).

At step 432, if the SPM in question receives a HM(CEB) or a FORGET(RIP, CEB), this means that a failure break has occurred in the allocation tree somewhere other than adjacent to this SPM. The CEB indicator means that the node containing this SPM is to be split from the allocation tree, thereby forming a subtree than cannot thereafter communicate with the rest of the allocation tree. Therefore, special action must be taken to dismantle or backout this subtree to respond to the remote tree breakage. If step 416 determines that the conversation being deallocated is the one that allocated this SPM, then the remaining nodes or SPMs are dismantled at step 418. This is initiated by sending a DEALLOCATE TYPE(ABEND) to all partner SPMs. Step 420 generates a new LUWID for this subtree for subsequent work. If the conversation being deallocated is not the one that allocated the TP served by this SPM, then the subtree containing this SPM is left intact and back-out (step 442 in FIG. 4c). At step 432 (FIG. 4b), if the HM(CEB) or FORGET(RIP, CEB) is not received, then this is a normal commit operation. Step 422 (FIG. 4a) increments the LUWID and proceeds with new work.

FIGS. 5 through 11 show the message flows between the nodes of FIG. 3 resulting from the execution of the program in FIG. 4 at each of the nodes. These FIGURES use some shorthand that is explained below. The nomenclature is specific to LU 6.2 and reference should be made to IBM publication SNA LU 6.2 REFERENCE:

PEER PROTOCOLS (SC31-6808) for further details.

D(S)=DEALLOCATE TYPE(SYNC_LEVEL)-:deallocate a conversation after committing.

D(A)=DEALLOCATE TYPE(ABEND): deallocate a conversation because of an abnormal occurrence such as a protocol violation or program detected error.

INIT=the sync point initiator (commit coordinator).

The letters A through F are used to represent the FIG. 3 nodes 300-1 through 6, respectively.

Under each node in the FIGURES is the sequence of LUWIDs, starting with A.1, that it is using whenever it returns control to the TP. The letter in the LUWID, e.g., A, indicates the node that created it, while the number indicates a sequence number relative to the start of events shown in the figure. Therefore, A.1 indicates that the root node A of the allocation tree initiated the first LUWID used for commit processing. A sequence such as "A.1; A.2(BO); A.3" is read: "The sequence number in A.1 is incremented to A.2; the A.2 LUW is backed out (BO); A.3 is the LUWID resulting from LUWID management flows."

Where it is necessary to show a time ordering between message flows in different parts of the tree, the flows are marked with occurrence numbers thus: "flow-(occurrence-number)."

In each example, it is assumed that all members of the entire distributed transaction start with LUWID A.1.

A conversation that fails in a FIGURE is denoted with an "X".

Figure 5:
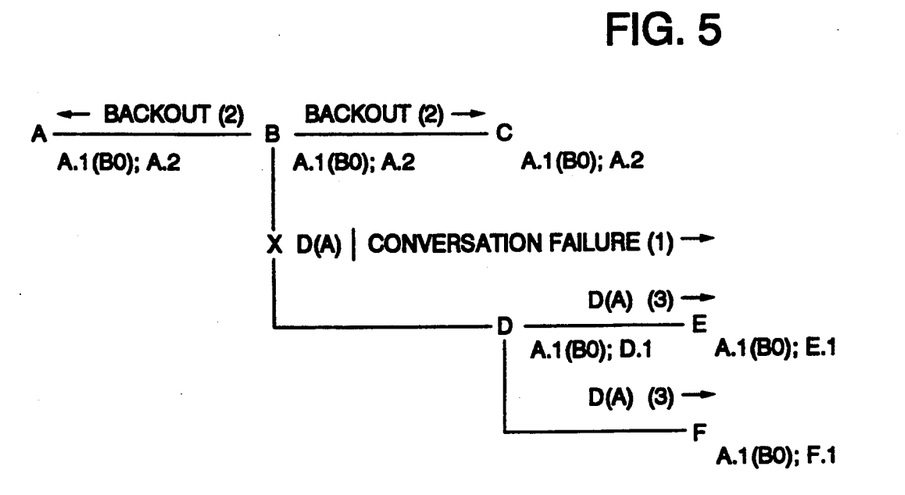
FIGS. 5 through 10 show the flow of messages between the nodes of the system of FIG. 3 for managing the LUWIDs for different circumstances occurring within the system.

FIG. 5 illustrates the case of a conversation failure or D(A) occurring in other than a commit operation. In the example, it is assumed that the conversation between nodes B and D is broken while a commit operation is not in progress. The TPs at B and D are in a state where only SYNCPT or BACKOUT verbs will be accepted. When the TP at B issues the BACKOUT verb, BACKOUT messages are sent to A and C; A, B, and C all back out the LUW identified by A.1, and increment the LUWID to proceed with a new LUW. When the transaction program at D issues the BACKOUT verb, the SPM issues DEALLOCATE TYPE(ABEND) on each of its remaining conversations, backs out the LUW identified by A.1, and generates a new LUWID so that it can proceed with a new transaction. E and F perform the same operations when they receive the DEALLOCATE TYPE(ABEND) from D. At the end of the message flows, A.1 has been backed out at each node and each of the four disconnected subtrees (A-B-C, D, E, and F) proceeds with a different LUWID.

Figure 6:
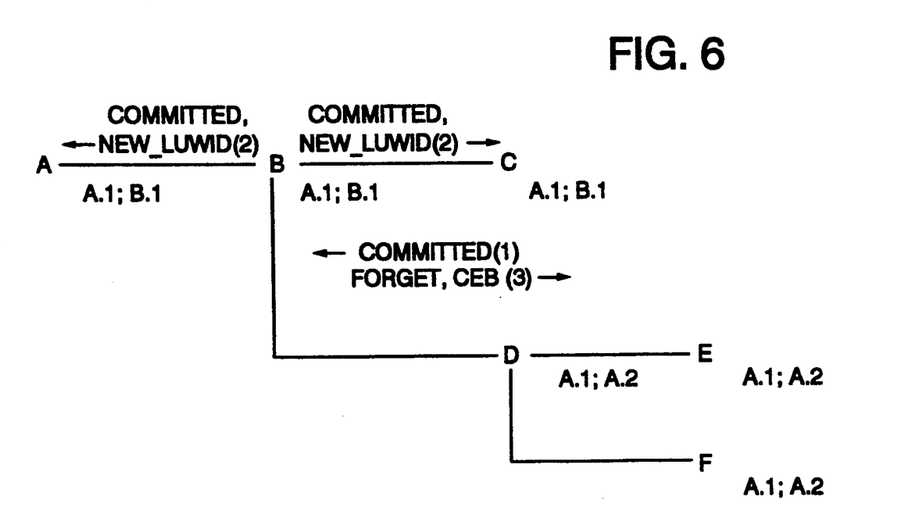

FIG. 6 illustrates the message flows following a normal conversation deallocation which occurs after a commit operation following a DEALLOCATE TYPE(SYNC_LEVEL) verb. LU E is the commit initiator. The conversation between B and D is deallocated when the commit operation completes. When B receives the COMMIT message from D, it generates a new LUWID for its subtree and propagates it to A and C along with the COMMIT message. Then it sends FORGET, CEB to D to finish the sync point operation. D, E, and F increment the original LUWID to generate the LUWID for the next LUW. At the end of the operation, LUWID A.1 has been committed at all nodes, and the two separated subtrees (A-B-C and D-E-F) are proceeding with different LUWIDs. Notice that the LUWID used by the D-E-F subtree continues to have the LU name for A in it, even though A is no longer connected to the subtree. This is not a problem, since the only purpose of the LU name in the LUWID is to ensure uniqueness, and LU A will ensure that it does not generate another LUWID that duplicates the A.1 it was using at the start of this example.

Figure 7:
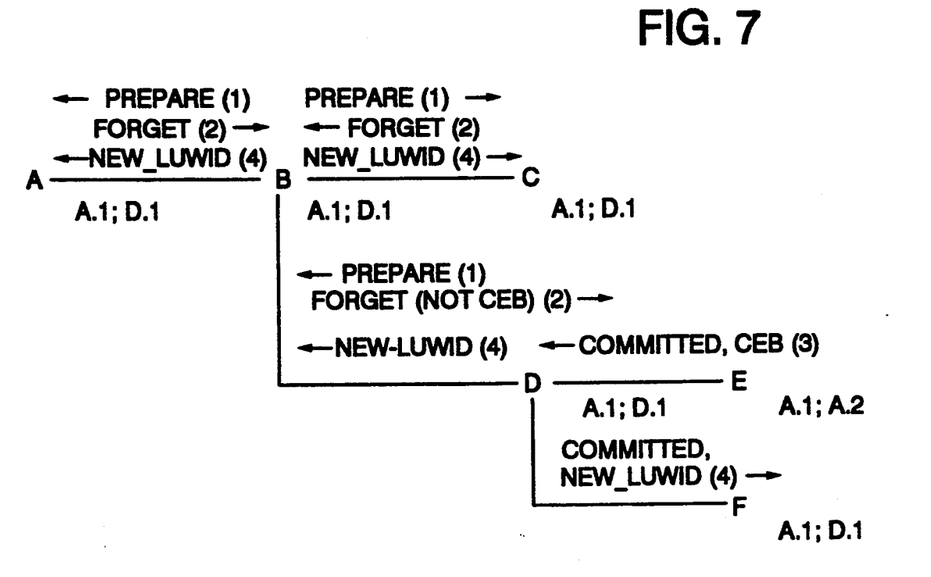

FIG. 7 illustrates the case in which a FORGET without a CEB is issued in answer to a PREPARE TO COMMIT message. LU E is the commit initiator. The A-B-C subtree votes FORGET in answer to PREPARE, indicating that no changes have been made to resources during the A.1 LUW. The sync point manager does not return control to the TPs in A, B, or C until the next message is received. This example shows why this is necessary. A deallocated conversation elsewhere in the transaction tree (between E and D) requires D to propagate a new LUWID to its subtree. A, B, and C cannot be allowed to continue until the new LUWID has arrived. If there are no conversations deallocated, the next message of any kind is a signal to the sync point manager in A, B, or C that no new LUWID will be sent. At the end of the operation, LUW A.1 has been committed at D, E, and F, no commitment is necessary at A, B, and C since no changes had been made there, and the two separated subtrees (E and F-D- B-A-C) proceed with different LUWIDs.

Figure 8:
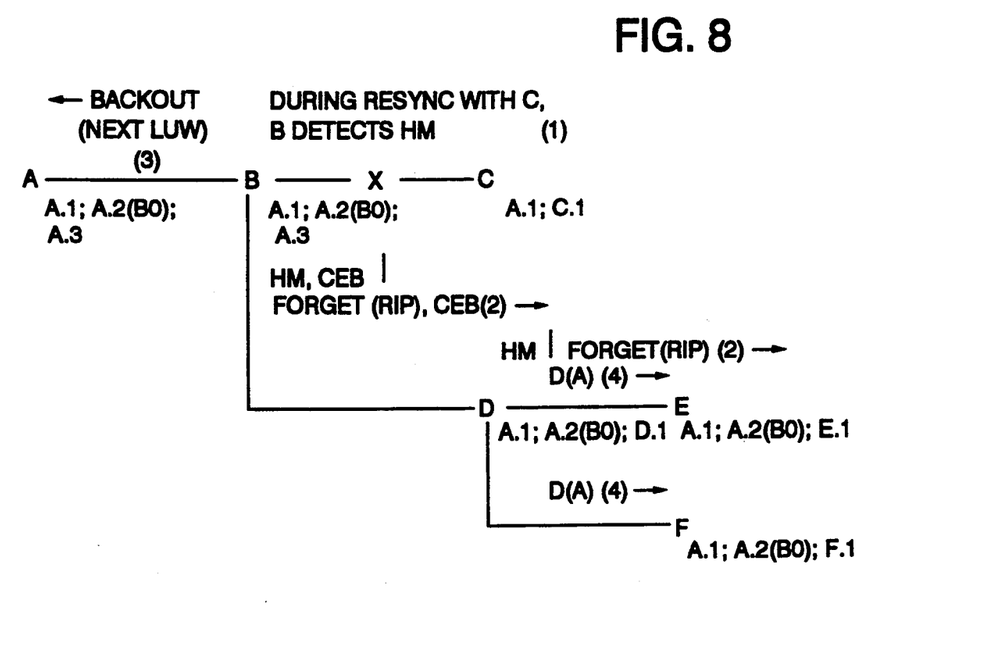

FIG. 8 illustrates the case in which HM CEB or FORGET, RIP CEB is sent down the allocation tree. LU E is the commit initiator. The conversation between B and C fails in the middle of the second phase of a commit operation. For simplicity, the early messages are not shown. Either the first resynchronization attempt fails, causing B to send FORGET, RIP in response to the COMMIT message it received from D, or B detects heuristic damage during resynchronization. In either case, the message from B to D is sent with the CEB indicator causing the conversation to be ended. B sends BACKOUT to A, since the TP at A may already have proceeded with LUWID A.2, which is also being used by transaction programs at E and F. After D propagates the HM or FORGET, RIP to its initiator E, E returns to the TP, which proceeds with LUWID A.2. Therefore D must follow the HM or FORGET, RIP message with a DEALLOCATE TYPE(ABEND) message, which backs out A.2 and causes E to generate a new LUWID for the next transaction. Since C has no downtree conversations, the only action it must perform before returning to its TP is to generate a new LUWID. If it had downtree conversations, it would send them DEALLOCATE TYPE (ABEND), which would cause them to backout LUW A.2 and generate their own new LUWIDs. At the end of this operation, A.1 has been committed at A, B, D, E, and F. The five separate subtrees (A-B, C, D, E, F) back out A.2 and proceed with different LUWIDs.

Figure 9:
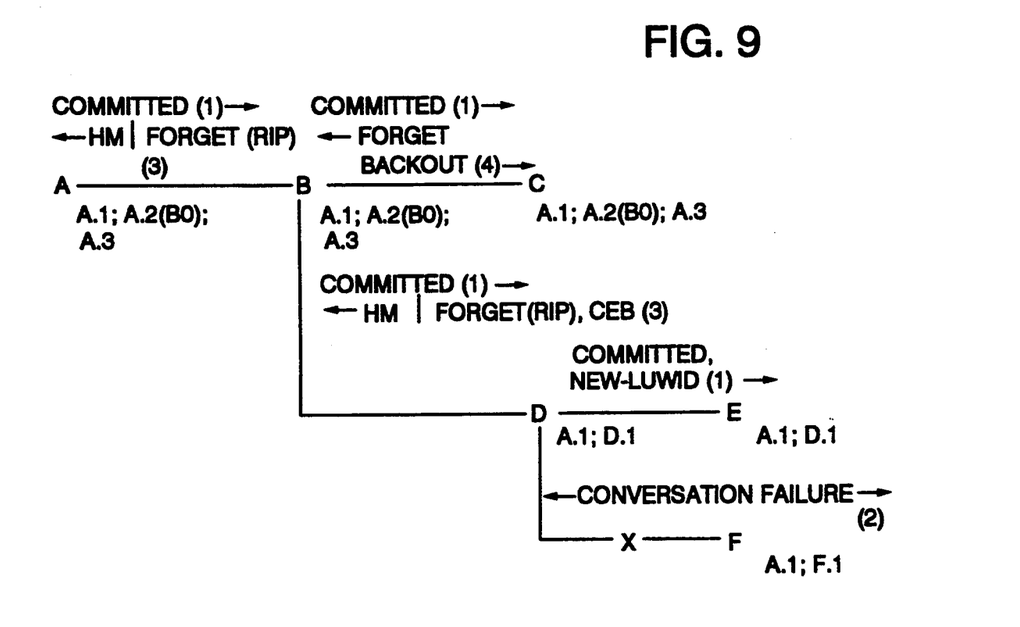

FIG. 9 illustrates the case in which HM CEB or FORGET, RIP CEB is sent up the allocation tree. LU A is the commit initiator. D detects a conversation failure with F while propagating the COMMIT message to E and F. For simplicity, the early messages are not shown. Resynchronization with F either fails or reveals that heuristic damage has occurred. D sends this information to B with the end conversation indicator (CEB) set. Since D's conversation with B is deallocated as part of the commit operation, D sends a new LUWID to E as part of the normal commit flow. Since B was the allocator of the conversation with D, when it receives the HM or FORGET, RIP message, it is responsible for backing out the next LUW to ensure that no node in its separated subtree is also working with LUWID A.2. Thus B backs out locally and sends a BACKOUT message to C. Since A will perform the same actions when it receives the HM or FORGET, RIP message from B, it is unnecessary for B to send BACKOUT to A. At the end of the operation, LUWID A.1 has been committed, LUWID A.2 has been backed out, and the separated subtrees (A-B-C, D-E, and F) all proceed with different LUWIDs. E uses the LUWID that D propagated to it in the normal commit processing.

Figure 10:
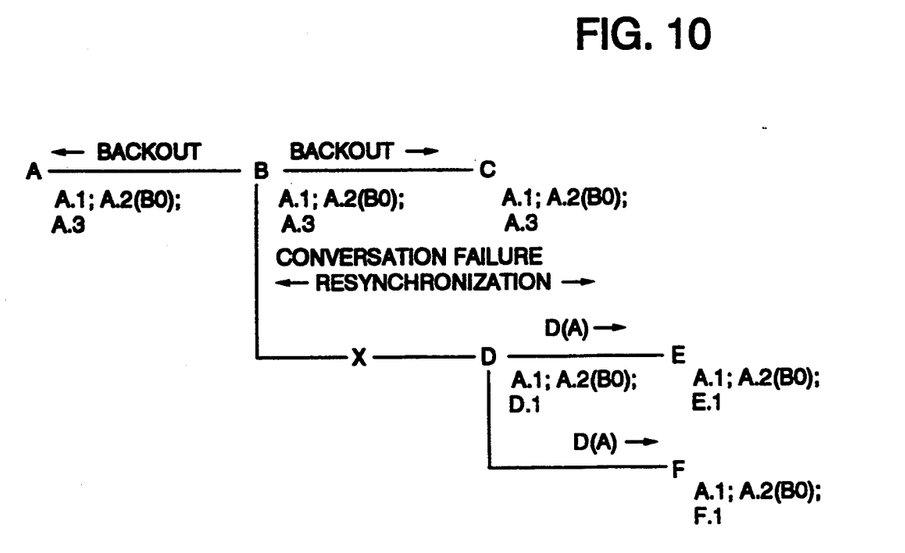

FIG. 10 illustrates the case of a conversation failure between nodes B and D during a commit operation. For simplicity, the entire commit sequence is not shown. In this example, which node is the commit initiator does not matter. After resynchronization is complete between B and D, BACKOUT is sent to A and C, and DEALLOCATE TYPE (ABEND) is propagated to E and F. At the end of the operation, LUW A.1 either backs out or commits, depending on the normal protocols governing resynchronization, LUW A.2 is backed out at all participants, and the separated subtrees (A-B-C, D, E, F) proceed with different LUWIDs.

It is to be understood that the above described arrangements are merely illustrative of the application of principles of the invention and that other arrangements may be devised by workers skilled in the art without departing from the spirit and scope of the invention.

I claim:

1. A method of managing unit-of-work identifiers in a chained two-phase commit or backout distributed database transaction system having a plurality of processing nodes logically connected to form a tree, in which, under predetermined conditions, each node automatically derives the next transaction identifier from the present transaction identifier, comprising the steps of in response to a nonfailure condition resulting in a severed tree, committing to a permanent state any modifications made to the distributed database in both of the first and second subtrees resulting from the severance, deriving the transaction identifier for the next transaction in each of the nodes of the first subtree, proceeding with transaction work in the first subtree, generating a new transaction identifier for the second tree, propagating the new identifier to all nodes of the second subtree, and proceeding with transaction work in the second subtree.

2. Apparatus for managing unit-of-work identifiers in a chained distributed database transaction system having a plurality of processing node logically connected to form a tree, in which, under predetermined conditions, each node automatically derives the next transaction identifier from the present transaction identifier, comprising in response to a nonfailure condition severing the system and resulting in a first subtree and a second subtree, means in both the first subtree and the second subtree for committing to a permanent state any modifications made to the distributed database in both of the first and second subtrees, means in each node of the first subtree for deriving a transaction identifier for the next transaction, means responsive to the deriving means for proceeding with transaction work in the first subtree using the newly derived transaction identifier, means in one of the nodes of the second subtree for generating a new transaction identifier for the second tree, means in said one node for propagating the new identifier to all nodes of the second subtree, and means in the nodes of the second subtree for proceeding with transaction work in the second subtree using the newly propagated transaction identifier.

3. A method of managing unit-of-work identifiers under failure condition in a chained two-phase commit or backout distributed database transaction processing system having a plurality of processing nodes logically connected to form a transaction tree, in which, under nonfailure conditions, each node automatically increments its present identifier at the end of processing a present transaction to derive the next transaction identifier, said method, in response to a communication failure between two nodes of the system, comprising the steps of backing-out all database changes which are part of the present transaction in a first one of the subtrees formed by the communication failure, incrementing the transaction identifier in each of the nodes of the first subtree, and proceeding with transaction work in the first subtree, and backing-out all database changes which are part of the present transaction in a second one of the subtrees formed by the communication failure, and dismantling the second subtree.

4. Apparatus for managing unit-of-work identifiers in a chained distributed database transaction system having a plurality of processing nodes logically connected to form a tree, in which, under predetermined conditions, each node automatically derives the next transaction identifier from the present transaction identifier, said apparatus, in response to a failure condition severing the system and thereby resulting in a first subtree and a second subtree, comprising means in each of the first and second subtrees for forcing the distributed database in the subtrees to consistent states, means in each node of the first subtree for deriving a transaction identifier for the next transaction, means responsive to the deriving means for proceeding with transaction work in the first subtree using the newly derived transaction identifier, and means for dismantling the second subtree.

5. In chained distributed database transaction system having a plurality of processing nodes logically connected to form a tree, in which, under predetermined conditions, each node automatically derives the next transaction identifier from the present transaction identifier, apparatus in each node, responsive to a failure condition severing the system and thereby resulting in a first subtree and a second subtree, for managing unit-of-work identifiers, said apparatus in each node of the first subtree comprising means for committing or backing out modifications associated with the present transaction, means for deriving a transaction identifier for the next transaction to be processed by the node, and means responsive to the deriving means for proceeding with transaction work in the node using the newly derived transaction identifier, said apparatus in each node of the second subtree comprising means for dismantling connections between the node and other adjacent nodes of the second subtree.

6. A method of managing unit-of-work identifiers in a chained two-phase commit or backout distributed database transaction system having a plurality of processing nodes logically connected to form a tree, in which, under predetermined conditions, each node automatically derives the next transaction identifier from the present transaction identifier, said method in response to a failure condition resulting in a severed tree comprising the steps of forcing the distributed database in the first and second subtrees resulting from the severance to consistent states, and deriving the transaction identifier for the next transaction in each of the nodes of the first subtree, proceeding with transaction work in the first subtree, and dismantling the second subtree.

7. The method of claim 6 wherein the tree comprises a root node from which building of the tree initiates when the tree is first established, said method further comprising the steps of determining in each subtree if the subtree is further from the root node than the other subtree, and designating the subtree that is further from the root node as the second subtree.

8. A method of managing unit-of-work identifiers in a chained two-phase commit or backout distributed database transaction system having a plurality of processing nodes logically connected to form a tree, in which, under predetermined conditions, each node automatically derives the next transaction identifier from the present transaction identifier, said tree having a root node from which building of the tree initiates when the tree is first established, comprising the steps of
- in response to a failure condition resulting in a severed tree,
- forcing the distributed database in the first and second subtrees resulting from the severance to consistent states,
- determining in each subtree if the subtree is further from the root node than the other subtree,
- designating the subtree that is further from the root node as the second subtree,
- deriving the transaction identifier for the next transaction in each of the nodes of the first subtree, and
- dismantling the second subtree,
- wherein said step of forcing all nodes in both subtrees to consistent states further comprises determining if the failure occurred during commit or backout synchronization operations of the present transaction, if the failure occurred during commit synchronization operations of the present transaction, allowing the commit operation to complete in both subtrees, and backing out the next transaction in any node of the system that has already started processing of the next transaction.

9. The method of claim 8 wherein
- if the failure occurred during transaction processing of the present transaction and before the beginning of commit or backout synchronization operations of the present transaction,
- backing out the present transaction in both subtrees.

10. In chained distributed database transaction system having a plurality of processing nodes logically connected to form a tree, in which, under predetermined conditions, each node automatically derives the next transaction identifier from the present transaction identifier, apparatus in each node, responsive to a nonfailure condition severing the system and thereby resulting in a first subtree and a second subtree, for managing unit-of-work identifiers,
- said apparatus in each node of the first subtree comprising means for committing modifications associated with the present transaction in accordance with all other nodes of the system,
- means for deriving a transaction identifier for the next transaction to be processed by the node, and
- means responsive to the deriving means for proceeding with transaction work in the node using the newly derived transaction identifier,
- said apparatus in each node of the second subtree comprising
- means for committing modifications associated with the present transaction in accordance with all other nodes of the system,
- means for generating a new transaction identifier for the second tree,
- means for propagating the new identifier to all other nodes adjacent to this node in the second subtree, and
- means for proceeding with transaction work using the new transaction identifier.

11. The apparatus of claim 10 further comprising
- means in each node of the second subtree responsive to a prescribed condition for determining if the node is designated to generate the new transaction identifier for the second subtree, and
- means responsive to the determining means for activating the propagating means.

* * * * *